(No Model.)
C. A. STREETER.
JOURNAL BEARING.
No. 357,737. Patented Feb. 15, 1887.
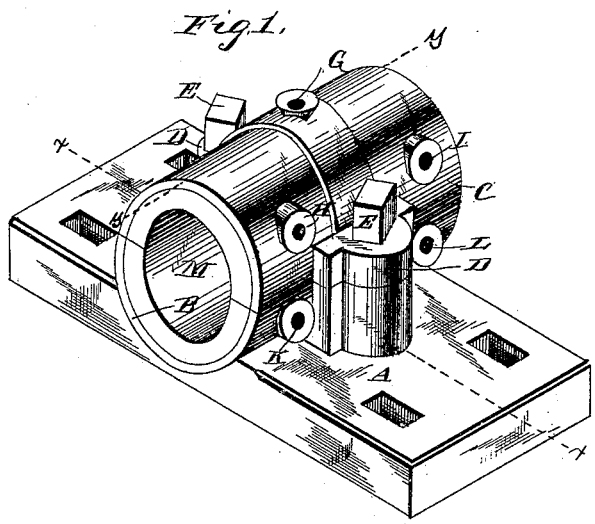
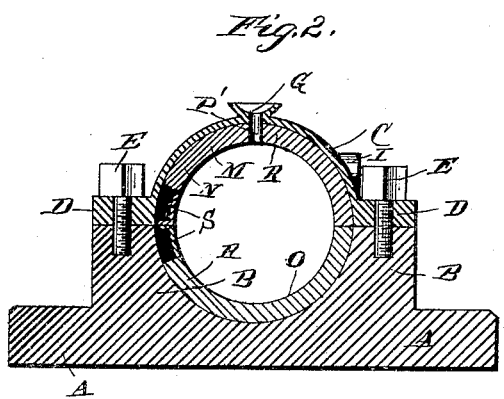
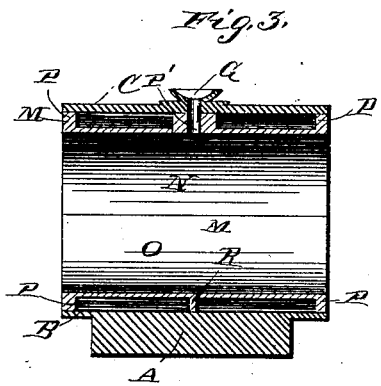
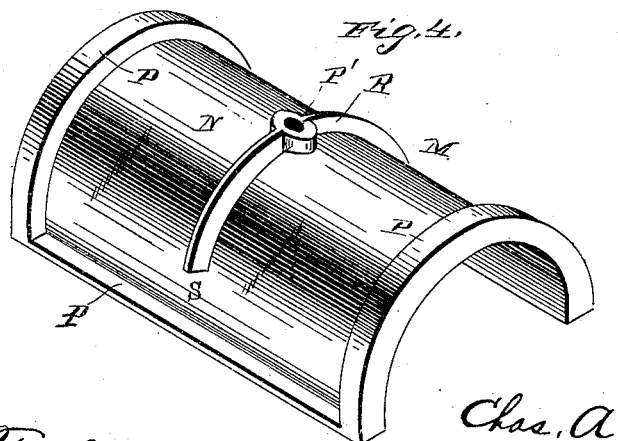
Witnesses
Chas. L. Taylor
E. G. Siggers
Inventor
Chas. A. Streeter
By his Attorney

UNITED STATES PATENT OFFICE.

CHARLES A. STREETER, OF FRANKLIN FALLS, NEW HAMPSHIRE.

JOURNAL-BEARING.

SPECIFICATION forming part of Letters Patent No. 357,737, dated February 15, 1887.

Application filed October 16, 1886. Serial No. 216,439. (No model.)

*To all whom it may concern:*

Be it known that I, CHARLES A. STREETER, a citizen of the United States, residing at Franklin Falls, in the county of Merrimac and State of New Hampshire, have invented a new and useful Improvement in Journal-Bearings, of which the following is a specification.

My invention relates to an improvement in journal-bearings for the shafts of heavy machines; and it consists in the peculiar construction and combination of devices, that will be more fully set forth hereinafter, and particularly pointed out in the claims.

The object of my invention is to provide a journal-bearing with a water-chamber which surrounds the journal, whereby the latter is kept cool, and thereby an economy in lubricating-oil is effected and the journal prevented from wearing with undue rapidity.

In the drawings, Figure 1 is a perspective view of a journal-bearing embodying my improvements. Fig. 2 is a vertical sectional view of the same, taken on the line $x$ $x$ of Fig. 1. Fig. 3 is a similar view taken on the line $y$ $y$ of Fig. 1. Fig. 4 is a detail perspective view of one of the sections of the gland.

A represents the base of the journal-bearing, and formed integrally with the same is the lower semi-cylindrical section, B, of the bearing. C represents the upper semi-cylindrical section of the bearing, which is provided on opposite sides, at its center, with the projecting ears D, adapted to receive bolts E, which connect the upper and lower sections of the bearing together.

In the upper side of the section C is an opening, G, through which the oil or other lubricating material is poured, and on one side of the section C, near the ends thereof, are made openings H and I, to which the ends of water-pipes are attached. The lower section, B, is also provided on one side with openings K and L, to which water-pipes are connected.

M represents a gland, which is cylindrical in shape, and is adapted to fit between the sections of the journal bearing or box, and the said gland is made in two semi-cylindrical sections, N and O, which are secured firmly together in the journal or box when the sections of the latter are bolted together. The exterior diameter of the gland is equal to the interior diameter of the journal bearing or box, and the semi-cylindrical sections of the gland are each provided with flanges P, which extend outwardly from their sides and ends, and thereby adapt the sections of the gland to fit snugly between the sections of the box. The spaces thus formed between the outer sides of the gland-sections and the inner sides of the sections of the box form water-chambers, which are divided transversely at the center by means of annular flanges R, with which the glands are provided. A space is left between one end of each flange R and the adjacent side flange of the gland, thereby leaving an opening, S, through which the water can flow.

Through the center of the upper gland-section, N, is an opening, P', which registers with the opening G of the section C of the box, so as to convey the oil or lubricant to the journal. While the shaft is rotating, a constant circulation of water is maintained in the water-chamber surrounding the glands by means of the water-pipes previously described, and thus the journal is prevented from becoming heated, thereby effecting an economy in the lubricant, and also lessening wear and danger from fire.

Having thus described my invention, I claim—

1. The combination, with the separable upper and lower sections, C and B, of the journal-bearing, of the gland-sections secured between the sections of the bearing, the said gland-sections having the water chambers formed therein, for the purpose set forth, substantially as described.

2. The combination of the separable sections of the journal-bearing with the gland-sections adapted to fit between the bearing-sections and be covered thereby, the said gland-sections having the projecting flanges P at their sides and ends, and thereby forming water-chambers between the opposing sides of the gland-sections and the bearing-sections, substantially as described.

3. The gland-sections, for the purpose set forth, having the projecting flanges P at their sides and ends, the transverse flange R, extending nearly from one side to the other, thus leaving an opening, S, between the ends of the gland at one side thereof, and the openings near the ends of the gland-sections on the side opposite the opening S, for the attachment of water-pipes, substantially as described.

4. The combination, with a journal-bearing, of the gland formed of two semi-cylindrical sections having the flanges on their sides and ends to fit against the inner sides of the journal-box, and thereby form water-chambers between the glands and the journal-box, for the purpose set forth, substantially as described.

5. The combination of the upper and lower separable sections of the journal-bearing, the former being provided with the opening G, for lubricating-oil, with the gland-sections secured between the sections of the journal-bearing, and in which the shaft is adapted to turn, the said gland-sections having water-chambers formed between them and the opposing sides of the journal-bearing, one of the said gland-sections having an offset, R, in which an opening, P', is made to communicate with the opening G and convey oil from the latter to the shaft, substantially as described.

In testimony that I claim the foregoing as my own I have hereto affixed my signature in presence of two witnesses.

CHARLES A. STREETER.

Witnesses:
FRANK H. DANIELL,
FRANK E. DANIELL.